US008204967B2

(12) United States Patent
Goel et al.

(10) Patent No.: US 8,204,967 B2
(45) Date of Patent: Jun. 19, 2012

(54) DYNAMIC CHAIN CREATION AND SEGMENTATION OF THE PACKET-FORWARDING PLANE (75) Inventors: Rajiv Goel, Milpitas, CA (US); Jianyu Chen, San Jose, CA (US); Scott Molloy, Mandalong (AU); Chung T. Nguyen, San Jose, CA (US); David Ward, Somerset, WI (US); John Bettink, San Jose, CA (US); Peramanayagam Marimuthu, Madurai (IN)

(73) Assignee: Cisco Technology, Inc., San Jose, CA (US)

( * ) Notice: Subject to any disclaimer, the term of this patent is extended or adjusted under 35 U.S.C. 154(b) by 2899 days.

(21) Appl. No.: 10/824,725

(22) Filed: Apr. 14, 2004

(65) Prior Publication Data
US 2005/0251582 A1 Nov. 10, 2005

(51) Int. Cl.
*G06F 15/177* (2006.01)
(52) U.S. Cl. ...................................................... 709/220
(58) Field of Classification Search .......... 709/220–222, 709/238–248, 227–229
See application file for complete search history.

(56) References Cited

U.S. PATENT DOCUMENTS

| 6,499,064 | B1 |   | 12/2002 | Carlson et al. |         |
|-----------|----|---|---------|----------------|---------|
| 6,507,874 | B1 | * | 1/2003  | Tuniman et al. | 709/247 |
| 6,601,106 | B1 | * | 7/2003  | Moberg et al.  | 709/238 |
| 7,006,532 | B1 |   | 2/2006  | Kathail et al. |         |
| 7,039,720 | B2 | * | 5/2006  | Alfieri et al. | 709/242 |
| 7,324,547 | B1 | * | 1/2008  | Alfieri et al. | 370/461 |
| 2001/0056503 | A1 | * | 12/2001 | Hibbard     | 709/250 |
| 2003/0120822 | A1 | * | 6/2003  | Langrind et al. | 709/251 |
| 2003/0126195 | A1 | * | 7/2003  | Reynolds et al. | 709/203 |
| 2003/0236918 | A1 |   | 12/2003 | Manor et al.   |         |
| 2005/0086367 | A1 | * | 4/2005  | Conta et al.   | 709/238 |
| 2005/0108315 | A1 | * | 5/2005  | Singh et al.   | 709/200 |

OTHER PUBLICATIONS

International Searching Authority, "Notification of Transmittal of the International Search Report and the Written Opinion of the International Searching Authority, or the Declaration," PCT/US05/11982, dated Nov. 27, 2006, 6 pages.
UK Intellectual Property Office, "Examination Report", application No. GB0619599.4, 6 pages.
Claims, application No. GB0619599.4, 3 pages.
State Intellectual Property Office of the People's Republic of China, "The First Office Action", Foreign application No. 200580009491.5, Dated Jun. 27, 2008, 8 pages. Claims, Foreign application No. 200580009491.5, 11 pages.
State Intellectual Property Office of the People's Republic of China, "The Second Office Action", Foreign application No. 200580009491.5, Dated Dec. 12, 2008, 6 pages.
Current Claims, Foreign application No. 200580009491.5, 7 pages.

* cited by examiner

*Primary Examiner* — Benjamin R Bruckart
(74) *Attorney, Agent, or Firm* — Hickman Palermo Truong Becker Bingham Wong LLP (57) ABSTRACT

A method is disclosed for dynamically creating encapsulation and decapsulation chains and segmenting the packet-forwarding plane. A distributed router may comprise multiple cards, each exposing a subset of the router's physical interfaces. Some physical interfaces may be configured to send/receive only certain types and destinations of data packets. Some cards might not expose any physical interfaces configured to send/receive a particular type and destination of packet, making encapsulation and/or decapsulation chains for virtual interfaces that process data packets of the particular type useless on those cards. Therefore, instead of always creating both encapsulation and decapsulation chains for a virtual interface on a card, an aspect of the method dynamically determines which of the encapsulation and decapsulation chains are useful for a virtual interface on that card, and creates only those chains that are useful on that card. Thus, the packet-forwarding plane is segmented into independent encapsulation and decapsulation segments.

31 Claims, 5 Drawing Sheets

DYNAMIC CHAIN CREATION AND SEGMENTATION OF THE PACKET-FORWARDING PLANE

FIELD OF THE INVENTION

The present invention generally relates to routing devices in computer networks. The invention relates more specifically to a method and apparatus for dynamically creating encapsulation and decapsulation chains and segmenting the packet-forwarding plane.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

When information is to be transmitted over a computer network, such as a Local Area Network (LAN) or a Wide Area Network (WAN), the information may be inserted, or "encapsulated" into data packets, which are then forwarded, network element-by-network element, from source to destination. Encapsulation typically involves the addition of one or more headers to a data packet that contains a message or data. Each header may contain additional information about how the data packet is to be handled as it traverses a network.

Multiple layers of encapsulation may be employed when encapsulating information for transmission over a network. Each layer of encapsulation may correspond to a different protocol. For example, an application level protocol header such as a Hypertext Transfer Protocol (HTTP) header may be "prepended" to (i.e., added to the front of) a message that is to be transmitted to an application that uses HTTP. Next, a transport layer protocol header such as a Transport Control Protocol (TCP) header may be prepended to the HTTP header if the data packet is to be transmitted over a network that uses TCP. Then, a network layer protocol header such as an Internet Protocol (IP) header may be prepended to the TCP header if the data packet is to be transmitted over a network that uses IP. Finally, a data-link protocol header such as an Ethernet Protocol header may be prepended to the IP header if the data packet is to be transmitted over a network that uses the Ethernet Protocol.

Thus, a message may be prepended with multiple headers during the encapsulation process. The data packet, including the headers, may be forwarded from one network element or forwarding device to another network element or forwarding device. For example, a router may forward a data packet to another router. After a router receives a data packet, the router inspects the contents of the data packet's front-most header. The router may handle the data packet based on the contents of the header. Next, the router may inspect the contents of the data packet's next-to-front-most header, and handle the data packet based on the contents of that header. The router may inspect the contents of each header from the front-most header to the rear-most header in succession, and handle the data packet based on the contents of each such header.

In handling a data packet, a router may strip a header off of the front of the data packet. For example, if a data packet is to be forwarded through a network that uses the High-level Data Link Control (HDLC) Protocol rather than the Ethernet Protocol, the router may strip the Ethernet Protocol header off of the front of the data packet, so that the HDLC Protocol can be prepended to the data packet instead. The process of inspecting headers as described above, including the possible stripping of such headers, may be called "decapsulation."

A router typically comprises multiple physical interfaces through which the router receives incoming data packets, and through which the router sends outgoing data packets. Different physical interfaces may be configured to send and/or receive different kinds of data packets. For example, a physical interface might be configured to send and receive only IP Version 4 (IPv4) packets. For another example, a physical interface might be configured to send and receive only IP Version 6 (IPv6) packets. A physical interface could be configured to send and receive both IPv4 and IPv6 packets.

As described in U.S. Pat. No. 6,601,106 B1, each physical interface may be associated with a separate "encapsulation chain" and a separate "decapsulation chain." Each decapsulation chain comprises one or more successive chain elements that successively perform decapsulation functions on data packets as those data packets are passed through those chain elements. Each encapsulation chain comprises one or more successive chain elements that successively perform encapsulation functions on data packets as those data packets are passed through those chain elements. Each physical interface is associated with both an encapsulation chain and a decapsulation chain. Each physical interface is bi-directional.

A router may receive a data packet on a first of several physical interfaces. The router may pass the data packet through one or more chain elements of the decapsulation chain associated with the first physical interface. At some point during or following the data packet's progression through the first physical interface's decapsulation chain, the router may select, from among the router's multiple physical interfaces, a second physical interface through which the data packet needs to be transmitted in order to move the data packet towards the data packet's ultimate destination. Having made this determination, the router may provide the data packet to a selected chain element in the encapsulation chain that is associated with the second physical interface. The router may pass the data packet through one or more chain elements of the second physical interface's encapsulation chain. After emerging from the second physical interface's encapsulation chain's last chain element, the data packet may be transmitted out of the router through the second physical interface.

Formerly, all of a router's physical interfaces were consolidated on a single hardware "card". However, modern distributed routers may comprise multiple separate interconnected cards, such as line cards or routing processors. Each such card contains separate processing and memory resources. Each such card may expose a separate subset of a router's physical interfaces. For each physical interface, the encapsulation and decapsulation chains associated with that physical interface are constructed on the same card that exposes that physical interface. A data packet may be forwarded from a decapsulation chain on a first card to an encapsulation chain on a second card. Thus, a data packet may be received on one of a first card's physical interfaces, and transmitted out on one of a second card's physical interfaces.

In addition to the physical interfaces described above, a router may comprise one or more virtual interfaces. None of a router's physical ports is a virtual interface per se. Virtual interfaces are embodied in data structures and other software elements, and receive data packets from chains that are associated with physical interfaces. An example of a virtual interface is a "tunnel" interface, which is an interface to functionality that encapsulates a data packet, which conforms to one protocol, into another data packet, which may conform to a different protocol. For example, a tunnel interface may be an interface to functionality that encapsulates an IPv4 packet into an IPv6 packet. For another example, a tunnel interface may be an interface to functionality that encapsulates an IPv6 packet into an IPv4 packet. A tunnel interface may encapsulate an IPv4 packet into an IPv4 packet, or an IPv6 packet into an IPv6 packet, or a Connectionless Network Service (CLNS) packet into an IPv4 packet, etc.

As is explained above, a data packet may be received on any one of a distributed router's cards' physical interfaces. According to one approach, in order to allow a data packet to be forwarded to a particular type of virtual interface regardless of which card's physical interface received the data packet, a separate virtual interface of the particular type is provided for each separate card. Each such virtual interface is associated with a separate pair of encapsulation and decapsulation chains. For example, given five separate cards, each card might provide a separate IPv4-to-IPv6 tunnel interface, and each card might implement a separate encapsulation chain and a separate decapsulation chain for each such IPv4-to-IPv6 tunnel interface, resulting in five separate IPv4-to-IPv6 encapsulation chains, and five separate IPv4-to-IPv6 decapsulation chains.

Unfortunately, under this approach, the encapsulation chains constructed for a particular type of virtual interface on some cards might never be used. For example, given five separate cards, there might not be any physical interfaces on the first card that are configured to send IPv6 data packets. Under these circumstances, the encapsulation chain associated with the IPv4-to-IPv6 tunnel interface for the first card would never be used.

Similarly, under this approach, the decapsulation chains constructed for a particular type of virtual interface for some cards might never be used. For example, given five separate cards, none of the physical interfaces on the second card might be configured to receive IPv4 data packets. Under these circumstances, the decapsulation chain associated with the IPv4-to-IPv6 tunnel interface for the second card would never be used.

Encapsulation and decapsulation chains use a card's limited memory and processing resources. Creating chains that will never be used wastes these limited resources, which might otherwise be used for other purposes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamically creating encapsulation and decapsulation chains and segmenting the packet-forwarding plane is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The contents of U.S. Pat. No. 6,601,106 B1, entitled "PACKET PROCESSING USING NON-SEQUENTIAL ENCAPSULATION AND DECAPSULATION CHAINS" are hereby incorporated by reference in their entirety for all purposes as if fully set forth herein.

Embodiments are described herein according to the following outline:

1.0 General Overview
2.0 Structural and Functional Overview
3.0 Implementation Examples
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for dynamically creating encapsulation and decapsulation chains and segmenting the packet-forwarding plane. Instead of always creating both an encapsulation and a decapsulation chain for every virtual interface on each of a router's cards, it is dynamically determined, for each virtual interface of each card, whether both of those chains, only one of those chains, or neither of those chains are useful for that virtual interface of that card. Only those chains that are determined to be useful for that virtual interface are dynamically created on that card (e.g., by creating chain elements in the memory resources of that card). Chains that would be useless for a virtual interface of a card are not created on that card, thereby allowing a portion of that card's resources to be used for other purposes. Thus, a card might provide an encapsulation chain for a virtual interface without providing a decapsulation chain for that virtual interface, or a card might provide a decapsulation chain for a virtual interface without providing an encapsulation chain for that virtual interface, or a card might not provide either an encapsulation chain or a decapsulation chain for that virtual interface. Because either one or the other, both, or neither of an encapsulation chain and a decapsulation chain may be created for a virtual interface of a particular card, it may be said that the packet-forwarding plane has been segmented into independent encapsulation and decapsulation segments.

In other aspects, the invention encompasses a computer apparatus and a computer-readable medium configured to carry out the foregoing steps.

2.0 Structural and Functional Overview

Figure 1A:
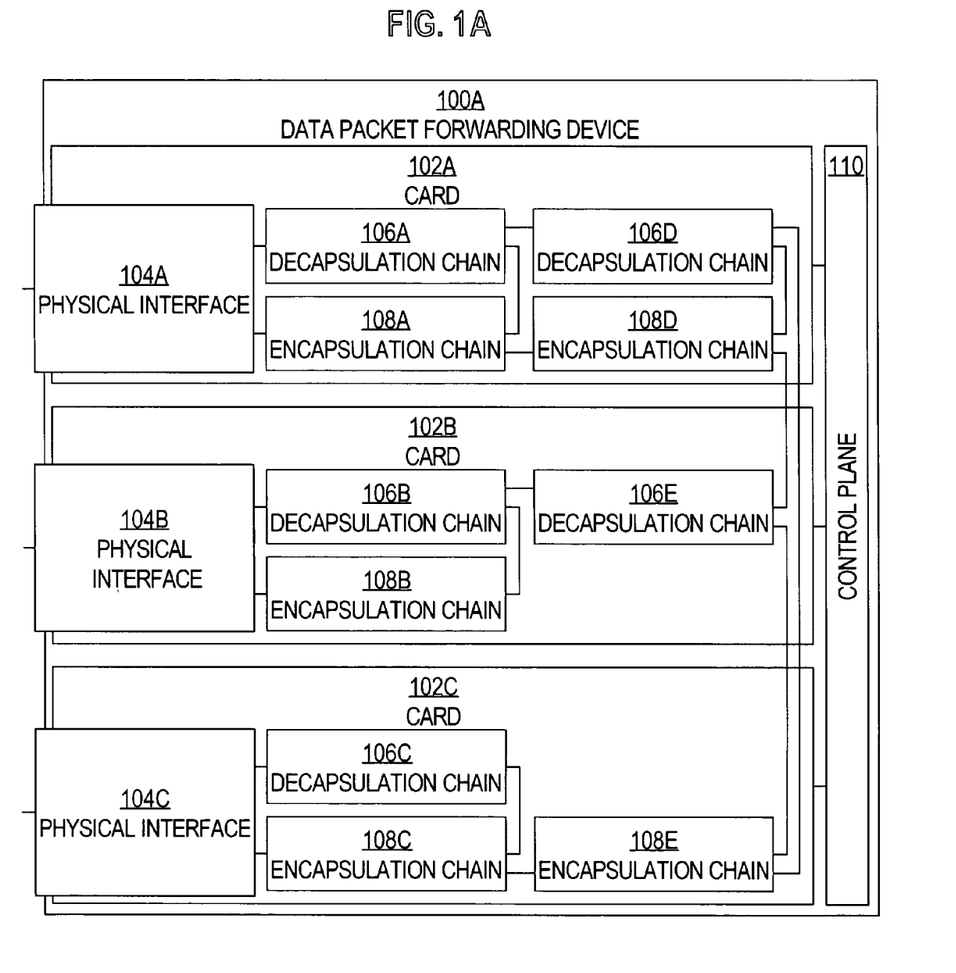
FIG. 1A is a block diagram that illustrates an overview of one embodiment of a data packet-forwarding device in which encapsulation chains and decapsulation chains are selectively created on the device's cards.

FIG. 1A is a block diagram that illustrates an overview of one embodiment of a data packet-forwarding device 100A in which encapsulation chains and decapsulation chains are selectively created on cards. Data packet-forwarding device 100A may be, for example, a distributed router. Data packet-forwarding device 100A comprises cards 102A-102C and control plane 110.

Cards 102A-102C are considered to be within the data "plane" of device 100A, as contrasted to control plane 110. Control plane 110 is an abstract representation of one or more processors, devices, and/or software and/or firmware elements. Cards 102A-102C may be, for example, line cards or routing processors. Although three cards are illustrated for purposes of example, data packet-forwarding device according to embodiments of the invention may comprise a greater or lesser number of cards than those illustrated. Each of cards 102A-102C comprises separate memory resources and processing resources. Each of cards 102A-102C is communicatively coupled to control plane 110. Thus, control plane 110 may configure the resources of cards 102A-102C to implement encapsulation and/or decapsulation chains on cards 102A-102C. There may or may not be a control plane presence on cards 102A-102C.

Each of cards 102A-102C exposes one or more bi-directional physical interfaces. More specifically, in this example, card 102A comprises physical interface 104A; card 102B comprises physical interface 104B; and card 102C comprises physical interface 104C. Although each of cards 102A-102C is illustrated as having one physical interface for purposes of example, cards according to embodiments of the invention may comprise a greater number of physical interfaces than those illustrated.

Each of physical interfaces 104A-104C may be communicatively coupled to a computer network, such as a LAN, WAN, or internetwork, through which that physical interface sends and/or receives data packets. Each of physical interfaces 104A-104C may be communicatively coupled to a separate network, or to different devices within the same LAN. Each of physical interfaces 104A-104C may be configured to send and/or receive data packets that are structured according to one or more specified protocols. For example, physical interface 104A might be configured to send and receive both IPv4 packets and IPv6 packets; physical interface 104B might be configured to send and receive IPv4 packets but not IPv6 data packets; and physical interface 104C might be configured to send and receive IPv6 packets but not IPv4 data packets.

Each of cards 102A-102C provides one or more encapsulation and/or decapsulation chains. More specifically, card 102A provides decapsulation chains 106A and 106D and encapsulation chains 108A and 108D; card 102B provides decapsulation chains 106B and 106E and encapsulation chain 106E; and card 102C provides decapsulation chain 106C and encapsulation chains 108C and 108E.

Each of decapsulation chains 106A-106E and encapsulation chains 108A-108E comprises one or more chain elements as described in U.S. Pat. No. 6,601,106 B1. Each such chain element may perform a different encapsulation or decapsulation function. For example, one chain element may decrypt data, another may decompress data, another may perform a switching function, another may rewrite data, another may compress data, and another may encrypt data. Different chains may comprise different chain elements. After processing data, a chain element typically passes the processed data to a next chain element in a chain.

Physical interface 104A is communicatively coupled to decapsulation chain 106A, which is communicatively coupled to encapsulation chain 108A, which is also communicatively coupled to physical interface 104A. Thus, physical interface 104A may receive a data packet and pass the data packet to decapsulation chain 106A. One or more chain elements in decapsulation chain 106A may process the data packet and pass the data packet to encapsulation chain 108A. One or more chain elements in encapsulation chain 108A may further process the data packet and pass the data packet to physical interface 104A. Physical interface 104A may transmit the data packet out of data packet-forwarding device 100A. According to one embodiment, any chain element in decapsulation chain 106A may pass a data packet to any chain element in encapsulation chain 108A. Thus, the decapsulation and encapsulation chains may be non-sequential.

In a similar manner, physical interface 104B is communicatively coupled to decapsulation chain 106B, which is communicatively coupled to encapsulation chain 108B, which is also communicatively coupled to physical interface 104B. In like manner, physical interface 104C is communicatively coupled to decapsulation chain 106C, which is communicatively coupled to encapsulation chain 108C, which is also communicatively coupled to physical interface 104C.

Because decapsulation chain 106A is communicatively coupled to physical interface 104A, decapsulation chain 106A corresponds to a physical interface. Similarly, decapsulation chain 104B, coupled to physical interface 104A, also corresponds to a physical interface. In contrast, decapsulation chain 106D and encapsulation chain 108D are not communicatively coupled to any physical interface in a direct and immediate sense. Instead, decapsulation chain 106D and encapsulation chain 108D are communicatively coupled to decapsulation chain 106A and encapsulation chain 108A, respectively. Therefore, decapsulation chain 106D and encapsulation chain 108D correspond to virtual interfaces rather than physical interfaces. These virtual interfaces have no direct correspondence to any of physical interfaces 104A-104C.

A chain element in decapsulation chain 106A may determine that a particular data packet should be sent to a virtual interface that corresponds to one or more chains that provide specialized functionality. For example, a chain element in decapsulation chain 106A might determine, based on an IPv4 packet's destination, that the IPv4 packet should be encapsulated within an IPv6 packet before being transmitted out of data packet-forwarding device 100A. Due to this determination, the chain element might forward the IPv4 packet to decapsulation chain 106D, which, together with encapsulation chain 108D or encapsulation chain 108E, provides the functionality necessary to encapsulate the IPv4 packet within an IPv6 packet. Although IPv4-to-IPv6 tunneling functionality is used in the examples below, virtual interfaces according to embodiments of the invention may provide interfaces to various other functionalities, such as Generic Routing Encapsulation (GRE) tunneling functionality, MPLS Traffic Engineering and IP Security Protocol (IPsec) functionality.

Decapsulation chain 106D may process the data packet and pass the data packet to encapsulation chain 108D or encapsulation chain 108E, depending on whether the data packet is supposed to be transmitted out on physical interface 104A or physical interface 104C. Encapsulation chain 108D or encapsulation chain 108E may further process the packet to encapsulate the IPv4 packet into an IPv6 packet. The IPv6 packet may then be passed to encapsulation chain 108A, if encapsulation chain 108D processed the data packet, or to encapsulation chain 108C, if encapsulation chain 108E processed the data packet.

Thus, decapsulation chains 106D and 106E and encapsulation chains 108D and 108E are associated with virtual interfaces that provide IPv4-to-IPv6 functionality. A separate IPv4-to-IPv6 virtual interface is provided by each of cards 102A-102C. However, not every IPv4-to-IPv6 virtual interface is associated with both an encapsulation chain and a decapsulation chain on the same card as the IPv4-to-IPv6 virtual interface. Although the IPv4-to-IPv6 virtual interface on card 102A is associated with both decapsulation chain 106D and encapsulation chain 108D, the IPv4-to-IPv6 virtual interface on card 102B is associated with only decapsulation chain 106E, and the IPv4-to-IPv6 virtual interface on card 102C is associated with only encapsulation chain 108E. Card 102B does not provide an encapsulation chain for the IPv4-to-IPv6 virtual interface on card 102B, and card 102C does not provide a decapsulation chain for the IPv4-to-IPv6 virtual interface on card 102C.

In the example above, because physical interface 104B is not configured to send IPv6 data packets, there is no need to create, on card 102B, an encapsulation chain for an IPv4-to-IPv6 virtual interface. Similarly, because physical interface 104C is not configured to receive IPv4 data packets, there is no need to create, on card 102C, a decapsulation chain for an IPv4-to-IPv6 interface. By avoiding the creation of such an encapsulation chain on card 102B and such a decapsulation chain on card 102C, the resources of cards 102B and 102C are conserved, while still providing an IPv4-to-IPv6 virtual interface on each card. Data packets processed by either decapsulation chain 106D or 106E may be passed to either encapsulation chain 108D or 108E, depending on those data packet's destinations. Encapsulation chains 108D and 108E may receive data packets from both decapsulation chains 106D and 106E.

According to one embodiment, each of physical interfaces 104A-104C may be associated with one or more destinations that eventually can be reached through that physical interface. Such destinations may be "learned" dynamically and associated with physical interfaces using routing protocols such as Border Gateway Protocol (BGP) and Open Shortest-Path First (OSPF) Interior Gateway Protocol. Destinations may be, for example, IP addresses, Multiprotocol Label Switching (MPLS) labels, networks, etc. Each virtual interface may be associated with a separate destination. According to one embodiment, an encapsulation chain for a particular virtual interface is not created on a card unless that card has at least one physical interface through which the particular virtual interface's associated destination eventually can be reached. According to one embodiment, a decapsulation chain for a particular virtual interface is not created on a card unless that card has at least one physical interface that is reachable by a network that carries data packets that are destined for the particular virtual interface's associated destination.

According to one embodiment, no decapsulation chains are created for MPLS Traffic Engineering (TE) virtual interfaces. According to one embodiment, an encapsulation chain for an MPLS TE virtual interface is created only on one card in a routing device: the card that has the physical interface that receives MPLS TE packets (i.e., the card that has the physical interface to which the MPLS TE virtual interface is tied).

Figure 1B:
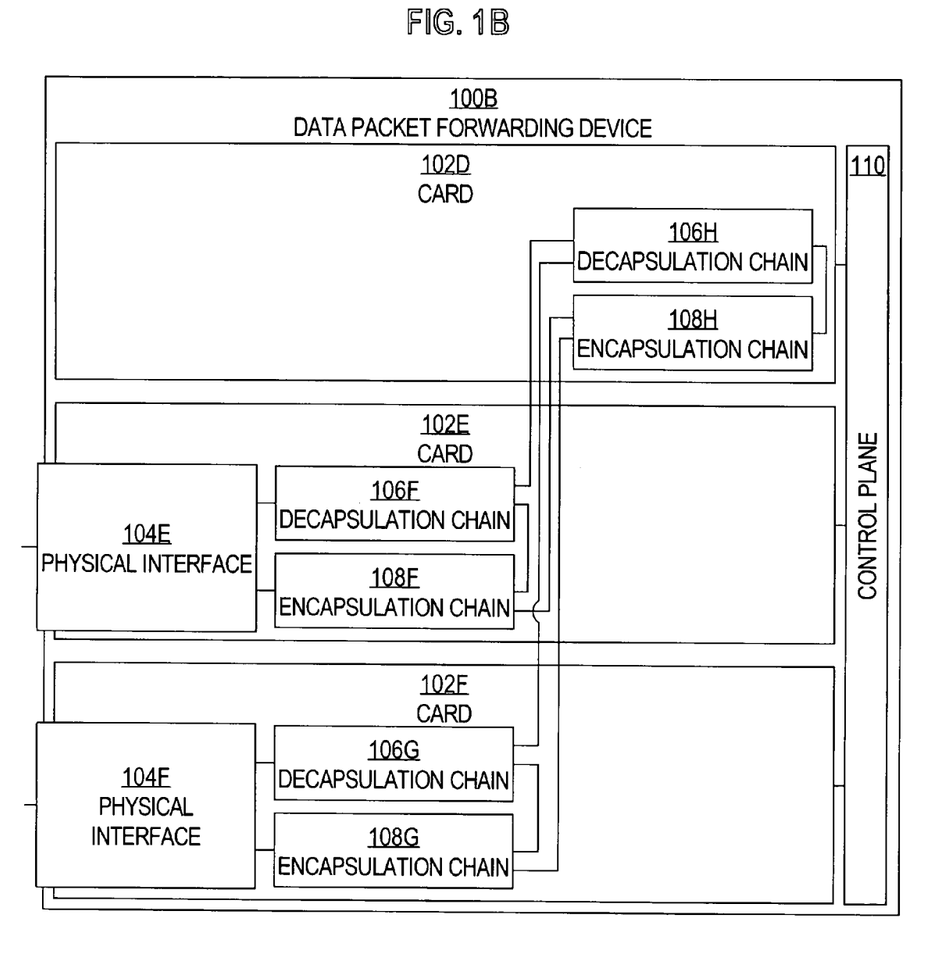
FIG. 1B is a block diagram that illustrates an overview of another embodiment of a data packet-forwarding device in which encapsulation chains and decapsulation chains are selectively created on the device's cards.

FIG. 1B is a block diagram that illustrates an overview of another embodiment of a data packet-forwarding device 100B in which encapsulation chains and decapsulation chains are selectively created on cards. Data packet-forwarding device 100B may be, for example, a distributed router. Data packet-forwarding device 100B comprises cards 102D-102F and control plane 110. Each of cards 102D-102F is communicatively coupled to control plane 110. Thus, control plane 110 may configure the resources of cards 102D-102F to implement encapsulation and/or decapsulation chains on cards 102D-102F.

Cards 102E and 102F provide one or more bi-directional physical interfaces. More specifically, card 102E comprises physical interface 104E, and card 102F comprises physical interface 104F. However, card 102D does not provide any physical interfaces. Card 102D is a special-purpose card that provides specialized functionality that may be used by cards 102E and 102F. For example, card 102D may provide IPsec processing functionality.

On card 102E, physical interface 104E is communicatively coupled to decapsulation chain 106F, which is communicatively coupled to encapsulation chain 108F, which is also communicatively coupled to physical interface 104E. On card 102F, physical interface 104F is communicatively coupled to decapsulation chain 106G, which is communicatively coupled to encapsulation chain 108G, which is also communicatively coupled to physical interface 104F.

Decapsulation chains 106F and 106G and encapsulation chains 108F and 108G correspond to physical interfaces. In contrast, decapsulation chain 106H and encapsulation chain 108H, located on card 102D, are not communicatively coupled to any physical interface in a direct and immediate sense. Instead, decapsulation chain 106H is communicatively coupled to decapsulation chains 106F and 106G, and encapsulation chain 108H is communicatively coupled to encapsulation chains 108F and 108G. Decapsulation chain 106H and encapsulation chain 108H correspond to virtual interfaces rather than physical interfaces.

A chain element in decapsulation chain 106F may determine that a particular data packet should be sent to a virtual interface that corresponds to one or more chains that provide specialized functionality. For example, a chain element in decapsulation chain 106F might determine that a data packet should undergo IPsec processing before being transmitted out of data packet-forwarding device 100B. Due to this determination, the chain element might forward the data packet to decapsulation chain 106H, which, together with encapsulation chain 108H, provides IPsec processing functionality.

Thus, decapsulation chain 106H and encapsulation chain 108H are associated with virtual interfaces that provide IPsec processing functionality. A separate IPsec virtual interface is provided by each of cards 102E and 102F. However, the IPsec virtual interface for card 102E is not associated with encapsulation and decapsulation chains on the same card as the IPsec virtual interface for card 102E. Likewise, the IPsec virtual interface for card 102F is not associated with encapsulation and decapsulation chains on the same card as the IPsec virtual interface for card 102F. Card 102E does not provide encapsulation or decapsulation chains for the IPsec virtual interface on card 102E, and card 102F does not provide encapsulation and decapsulation chains for the IPsec virtual interface on card 102F.

In the example above, because card 102D provides decapsulation chain 106H and encapsulation chain 108H to process data packets according to IPsec, there is no need to create, on cards 102E or 102F, decapsulation or encapsulation chains that perform IPsec processing. Instead of redundantly creating such chains on cards 102E and 102F, control plane 110 may create minimal contexts or states on cards 102E and 102F (e.g., within the memory resources of cards 102E and 102F). These minimal contexts or states may refer or point to decapsulation chain 106H on card 102D. These minimal contexts or states may be associated with the IPsec virtual interfaces of their respective cards.

By avoiding the creation of IPsec encapsulation and decapsulation chains on cards 102E and 102F, the resources of cards 102E and 102F are conserved, while still providing an IPsec virtual interface on each card. If data packets processed by either decapsulation chain 106F or 106G require IPsec processing, then those data packets may be passed to decapsulation chain 106H. Encapsulation chains 108F and 108G may receive data packets from encapsulation chain 108H.

Figure 2:
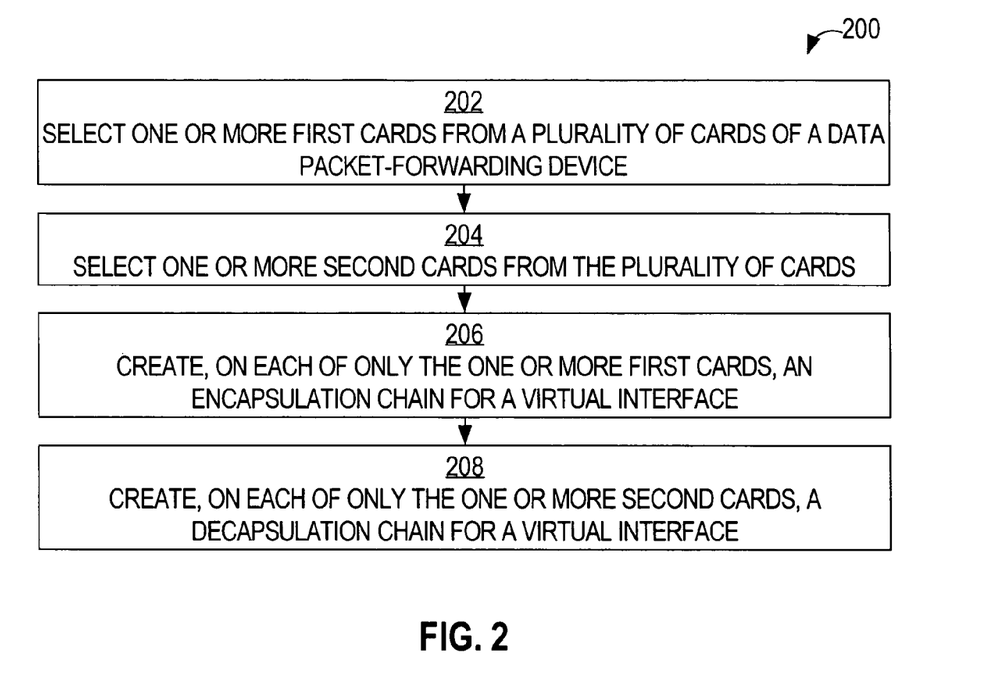
FIG. 2 is a flow diagram that illustrates a high level overview of one embodiment of a method for dynamically and selectively creating encapsulation and decapsulation chains for virtual interfaces, thus segmenting the packet-forwarding plane.

FIG. 2 is a flow diagram 200 that illustrates a high level overview of one embodiment of a method for dynamically and selectively creating encapsulation and decapsulation chains, thus segmenting the packet-forwarding plane. In block 202, from among a plurality of cards of a packet-forwarding device, one or more first cards are selected based on some criteria. For example, assuming that the selection is being performed in light of a particular IPv4-to-IPv6 tunnel, control plane 110 might select, from among cards 102A-102C, only cards that have at least one physical interface that is (a) configured or otherwise enabled to send and receive data packets that conform to the IPv6 protocol, and (b) associated with (i.e., can eventually reach) the particular IPv4-to-IPv6 tunnel's associated destination. For another example, control plane 110 might select, as the one or more first cards, only those of cards 102A-102C that have been specified by first user input.

In block 204, from among the plurality of cards, one or more second cards are selected based on some criteria. For example, assuming that the selection is being performed in light of a particular IPv4-to-IPv6 virtual interface, control plane 110 might select, from among cards 102A-102C, only cards that have at least one physical interface that is (a) configured or otherwise enabled to send and receive data packets that conform to the IPv4 protocol, and (b) reachable by a network that carries data packets that are destined for the particular virtual interface's associated destination. For another example, control plane 110 might select, as the one or more second cards, only those of cards 102A-102C that have been specified by second user input.

In block 206, on each of only the one or more first cards, an encapsulation chain is created for a virtual interface for that card. For example, control plane 110 might create, on each of the one or more first cards, a separate encapsulation chain for a particular IPv4-to-IPv6 virtual interface. Thus, control plane 110 would not create, on those of cards 102A-102C that lack physical interfaces that are (a) configured or otherwise enabled to send and receive IPv6 packets and (b) associated with the particular IPv4-to-IPv6 tunnel's associated destination, an encapsulation chain for the particular IPv4-to-IPv6 virtual interface.

In block 208, on each of only the one or more second cards, a decapsulation chain is created for a virtual interface for that card. For example, control plane 110 might create, on each of the one or more second cards, a separate decapsulation chain for the particular IPv4-to-IPv6 virtual interface. Thus, control plane 110 would not create, on those of cards 102A-102C that lack physical interfaces that are (a) configured to send and receive IPv4 data packets and (b) reachable by a network that carries data packets that are destined for the particular virtual interface's associated destination, a decapsulation chain for the particular IPv4-to-IPv6 virtual interface. Instead, control plane 110 might create, on those cards, a minimal context that refers to or points to such a decapsulation chain that has been created on another one of cards 102A-102C.

As a result of the method illustrated in flow diagram 200, data packet-forwarding devices such as those illustrated in FIG. 1A and FIG. 1B may be produced. In such data packet-forwarding devices, a card may provide a virtual interface to specialized functionality without having both (or either) encapsulation and decapsulation chains that correspond to that virtual interface. This beneficially differs from other approaches, in which an encapsulation chain for a virtual interface and a decapsulation chain for the virtual interface both were created on a card even if at least one of those chains was not needed on the card.

The method illustrated in flow diagram 200 may be performed repetitively. For example, the method may be performed at periodic intervals, or in response to occurrences of specified events. The method may be performed in response to a detected change in network topography, and/or in response to user configuration. The method may be performed in response to the addition or removal of a card from a packet-forwarding device. When a particular chain is no longer needed for a particular virtual interface, then any resources that were formerly used for that chain may be freed and made available for other purposes. Thus, virtual interfaces' encapsulation chains and decapsulation chains may be created and removed dynamically.

Detailed example implementations of the foregoing general approach are described below.

3.0 Implementation Examples

As is described above, a packet-forwarding device may comprise a plurality of cards, and each such card may comprise a plurality of virtual interfaces. According to one embodiment, the technique described below is performed for each virtual interface provided by any of a packet-forwarding device's cards.

For each such virtual interface, a number of encapsulation chains to be created for that virtual interface is determined: either one or zero. Additionally, for each such virtual interface, a number of decapsulation chains to be created for that virtual interface is determined: either one or zero.

Once the number of encapsulation chains and the number of decapsulation chains for a particular virtual interface have been determined, then the determined numbers of encapsulation chains and decapsulation chains are created for the virtual interface on the card that provides that virtual interface. In one embodiment, the numbers of encapsulation and decapsulation chains to be created for a particular virtual interface are determined in the manner described below.

Figure 3:
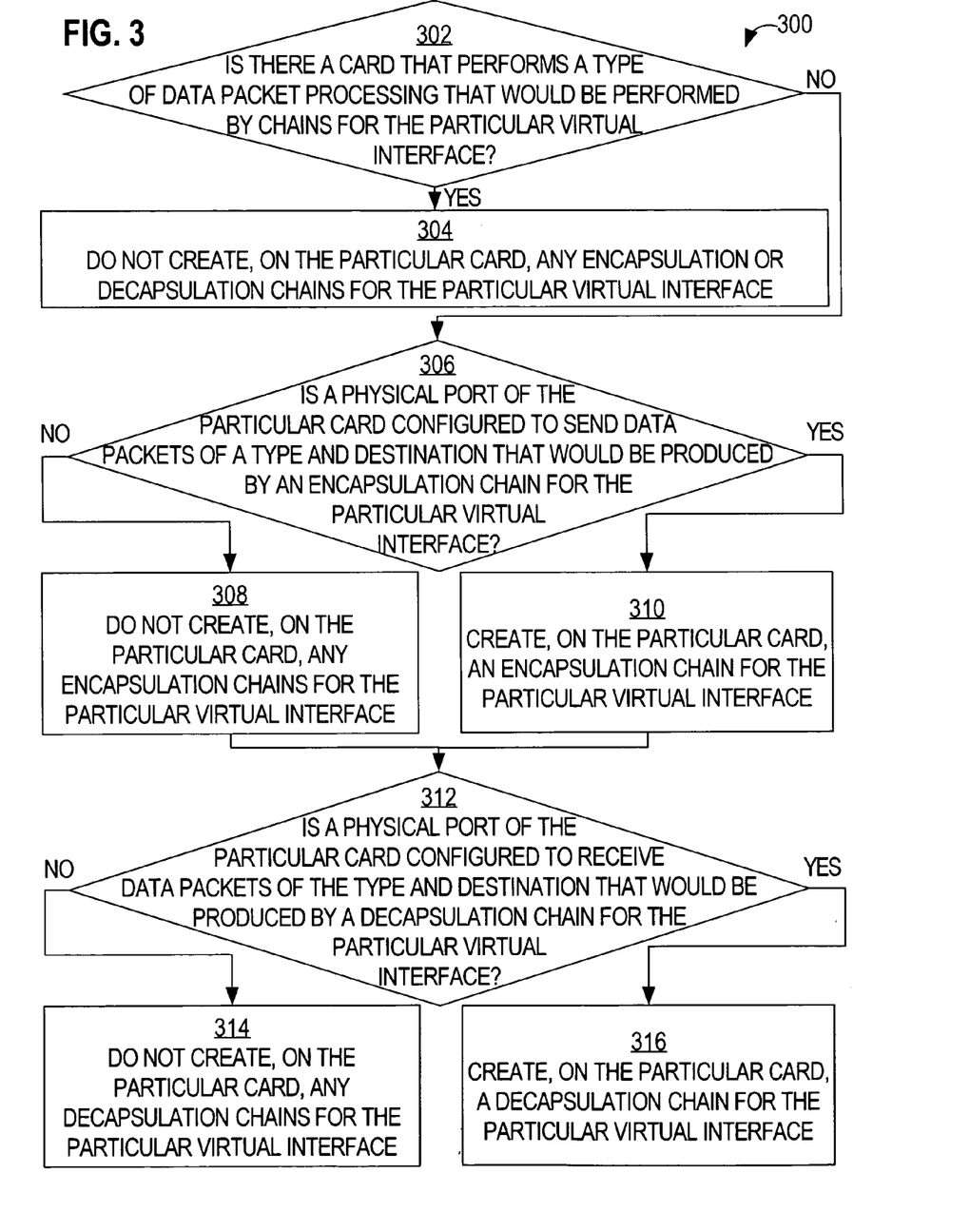
FIG. 3 depicts a flow diagram that illustrates one embodiment of a method for selectively creating an encapsulation chain and/or a decapsulation chain for a virtual interface.

FIG. 3 depicts a flow diagram 300 that illustrates one embodiment of a method for selectively creating an encapsulation chain and/or a decapsulation chain for a particular virtual interface of a particular card within a plurality of cards of a data packet-forwarding device.

In block 302, it is determined whether the plurality of cards includes a specialized card that is designed to perform a type of data packet processing that would be performed by or more chains for the particular virtual interface. For example, given an IPsec virtual interface on card 102E, control plane 110 may determine whether any of cards 102D-102F is a specialized card that is designed to perform IPsec processing on data packets. Chains for an IPsec virtual interface would perform IPsec processing on data packets.

For another example, given an IPv4-to-IPv6 virtual interface on card 102C, control plane 110 may determine whether any of cards 102A-102C is a specialized card that is designed to encapsulate IPv4 packets within IPv6 packets. Chains for an IPv4-to-IPv6 interface would encapsulate IPv4 packets within IPv6 packets.

If the plurality of cards includes a specialized card that is designed to perform a type of data packet processing that would be performed by chains for the particular virtual interface, then control passes to block 304. Otherwise, control passes to block 306.

In block 304, no encapsulation or decapsulations chains are created, on the particular card, for the particular virtual interface. The number of encapsulation chains and the number of decapsulation chains to be created for the particular virtual interface are both selected to be zero. No resources of the particular card are used to create an encapsulation chain for the particular virtual interface, and no resources of the particular card are used to create a decapsulation chain for the particular virtual interface. If any resources of the particular card were being used for an encapsulation chain for the particular virtual interface, then those resources are freed for other purposes. If any resources of the particular card previously were being used for a decapsulation chain for the particular virtual interface, then those resources are freed for other purposes. A minimal context or state, which refers to or points to a chain on the specialized card that was found within the plurality of cards, may be created on the particular card and associated with the particular virtual interface.

Alternatively, in block 306, it is determined whether at least one physical port of the particular card is (a) configured or otherwise enabled to send data packets of a type that would be produced by an encapsulation chain for the particular virtual interface and (b) associated with (i.e., can eventually reach) the particular virtual interface's associated destination. For example, given an IPv4-to-IPv6 virtual interface on card 102C, control plane 110 may determine whether physical interface 104C is configured to send and receive IPv6 data packets, which would be produced by an encapsulation chain for an IPv4-to-IPv6 virtual interface, and whether physical interface 104C is associated with the IPv4-to-IPv6 virtual interface's associated destination. If at least one physical port of the particular card is (a) configured to send data packets of the type that would be produced by an encapsulation chain for the particular virtual interface and (b) associated with the particular virtual interface's associated destination, then control passes to block 310. Otherwise, control passes to block 308.

In block 308, no encapsulation chains are created, on the particular card, for the particular virtual interface. The number of encapsulation chains to be created for the particular virtual interface is selected to be zero. No resources of the particular card are used to create an encapsulation chain for the particular virtual interface. If any resources of the particular card previously were being used for an encapsulation chain for the particular virtual interface, then those resources are freed for other purposes. Control passes to block 312.

Alternatively, in block 310, an encapsulation chain is created, on the particular card, for the particular virtual interface. The encapsulation chain is associated with the particular virtual interface. The number of encapsulation chains to be created for the particular virtual interface is selected to be one. Resources of the particular card are used to create the encapsulation chain for the particular virtual interface. Control passes to block 312.

In block 312, it is determined whether at least one physical port of the particular card is configured to receive data packets of a type that would be received by a decapsulation chain for the particular virtual interface. For example, given an IPv4-to-IPv6 virtual interface on card 102B, control plane 110 may determine whether physical interface 104B is (a) configured to send and receive IPv4 data packets, which would be processed by a decapsulation chain for an IPv4-to-IPv6 virtual interface, and (b) reachable by a network that carries data packets that are destined for the particular virtual interface's associated destination. If at least one physical port of the particular card is (a) configured to receive data packets of the type that would be processed by a decapsulation chain for the particular virtual interface and (b) reachable by a network that carries data packets that are destined for the particular virtual interface's associated destination, then control passes to block 316. Otherwise, control passes to block 314.

In block 314, no decapsulation chains are created, on the particular card, for the particular virtual interface. The number of decapsulation chains to be created for the particular virtual interface is selected to be zero. No resources of the particular card are used to create a decapsulation chain for the particular virtual interface. If any resources of the particular card previously were being used for a decapsulation chain for the particular virtual interface, then those resources are freed for other purposes Alternatively, in block 316, a decapsulation chain is created, on the particular card, for the particular virtual interface. The decapsulation chain is associated with the particular virtual interface. The number of decapsulation chains to be created for the particular virtual interface is selected to be one. Resources of the particular card are used to create the decapsulation chain for the particular virtual interface.

Thus, for any virtual interface on any card of a data packet-forwarding device, one or the other, neither, or both of an encapsulation chain and a decapsulation chain may be created. By allowing less than two chains to be created for virtual interfaces, the resources of the data packet-forwarding device are conserved without loss of encapsulation or decapsulation functionality.

4.0 Implementation Mechanisms—Hardware Overview

Figure 4:
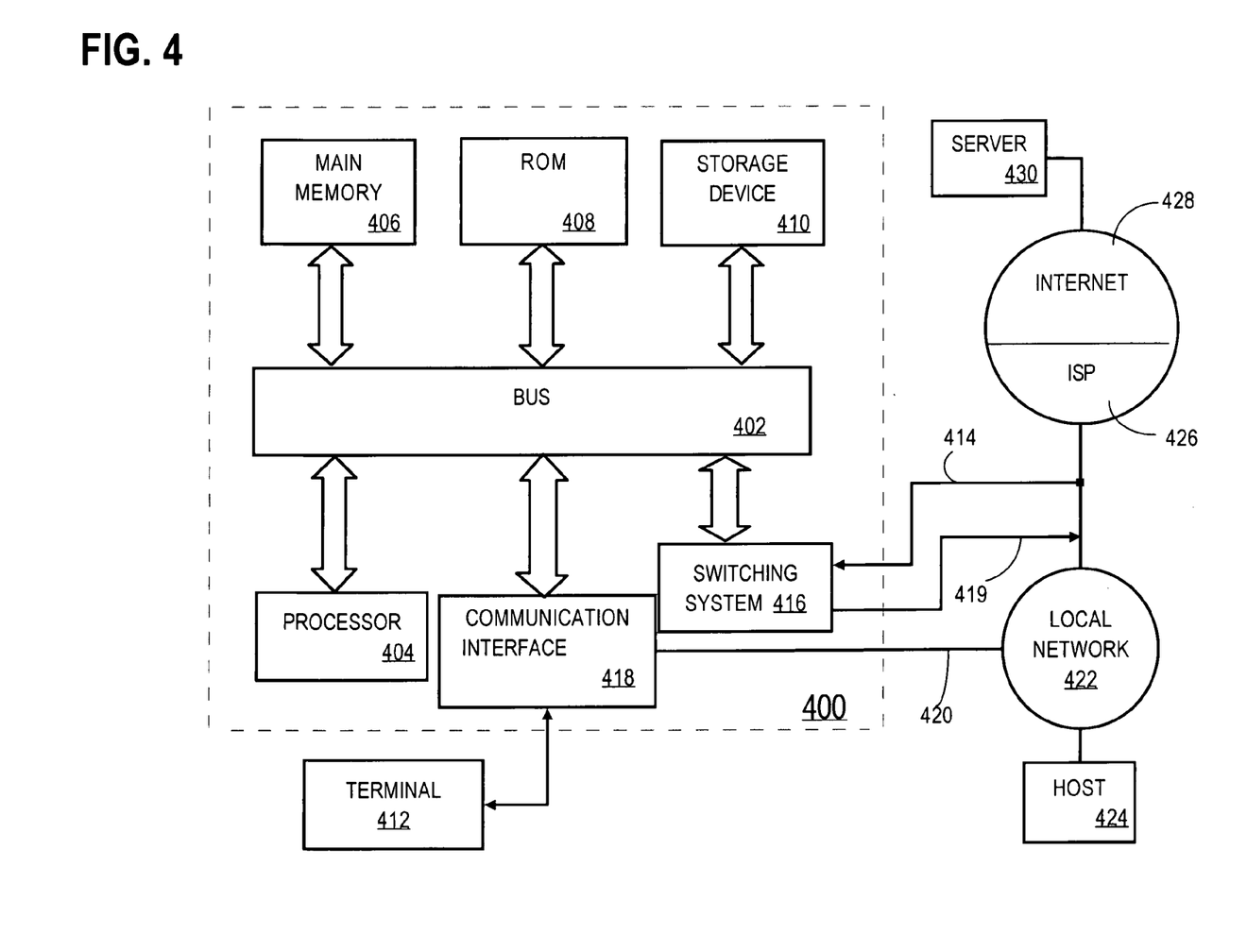
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for avoiding the storage of client state on computer system 400. According to one embodiment of the invention, computer system 400 provides for such updating in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for avoiding the storage of client state on a server as described herein.

Processor 404 may execute the received code as it is received and/or stored in storage device 410 or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of selectively creating chains for a virtual interface, the method comprising the computer-implemented steps of:
   determining whether a new encapsulation chain should be created, on a network element, for a particular virtual interface by determining whether at least one physical port of a particular card of the network element (a) is configured to send data packets of a type that would be produced by an encapsulation chain for the particular virtual interface and (b) can send data packets toward a destination associated with the particular virtual interface;
   determining whether a new decapsulation chain should be created, on the network element, for the particular virtual interface by determining whether at least one physical port of a particular card of the network element is configured to receive data packets of a type that would be processed by a decapsulation chain for the particular virtual interface;
   in response to determining that a new encapsulation chain should be created, on the network element, for the particular virtual interface, creating, on the network element, a new encapsulation chain for the particular virtual interface; and in response to determining that a new decapsulation chain should be created, on the network element, for the particular virtual interface, creating, on the network element, a new decapsulation chain for the particular virtual interface.

2. A method as recited in claim 1, further comprising:
in response to determining that a new encapsulation chain should not be created, on the network element, for the particular virtual interface, avoiding creating, on the network element, a new encapsulation chain for the particular virtual interface.

3. A method as recited in claim 1, further comprising:
in response to determining that a new decapsulation chain should not be created, on the network element, for the particular virtual interface, avoiding creating, on the network element, a new decapsulation chain for the particular virtual interface.

4. A method as recited in claim 1, further comprising:
in response to determining that a new encapsulation chain should not be created, on the network element, for the particular virtual interface, avoiding creating, on the network element, a new encapsulation chain for the particular virtual interface; and
in response to determining that a new decapsulation chain should not be created, on the network element, for the particular virtual interface, avoiding creating, on the network element, a new decapsulation chain for the particular virtual interface.

5. A method as recited in claim 1, wherein the step of determining whether a new encapsulation chain should be created further comprises the steps of:
in response to determining that no physical port of the particular card (a) is configured to send data packets of a type that would be produced by an encapsulation chain for the particular virtual interface and (b) can send data packets toward the destination associated with the particular virtual interface, then determining that a new encapsulation chain should not be created, on the network element, for the particular virtual interface.

6. A method as recited in claim 1, wherein the step of determining whether a new decapsulation chain should be created further comprises the steps of:
in response to determining that no physical port of the particular card is configured to receive data packets of a type that would be processed by a decapsulation chain for the particular virtual interface, then determining that a new decapsulation chain should not be created, on the network element, for the particular virtual interface.

7. A method as recited in claim 1, wherein the steps of determining whether a new encapsulation chain should be created and determining whether a new decapsulation chain should be created comprise the steps of:
determining whether a plurality of cards of the network element includes a specialized card that is designed to perform a type of data packet processing that would be performed by one or more chains for the particular virtual interface; and
in response to determining that the plurality of cards includes a specialized card that is designed to perform a type of data packet processing that would be performed by one or more chains for the particular virtual interface, then determining that a new encapsulation chain should not be created, on the network element, for the particular virtual interface and determining that a new decapsulation chain should not be created, on the network element, for the particular virtual interface.

8. A method as recited in claim 1, wherein the step of determining whether a new encapsulation chain should be created further comprises the steps of:
determining whether a plurality of cards of the network element includes a specialized card that is designed to perform a type of data packet processing that would be performed by one or more chains for the particular virtual interface; and
in response to determining that at least one physical port of the particular card (a) is configured to send data packets of a type that would be produced by an encapsulation chain for the particular virtual interface and (b) can send data packets toward the destination associated with the particular virtual interface, and the plurality of cards does not include any specialized card that is designed to perform a type of data packet processing that would be performed by one or more chains for the particular virtual interface, then determining that a new encapsulation chain should be created, on the network element, for the particular virtual interface.

9. A method as recited in claim 1, wherein the step of determining whether a new decapsulation chain should be created further comprises the steps of:
determining whether a plurality of cards of the network element includes a specialized card that is designed to perform a type of data packet processing that would be performed by one or more chains for the particular virtual interface; and
in response to determining that at least one physical port of the particular card is configured to receive data packets of a type that would be processed by a decapsulation chain for the particular virtual interface, and the plurality of cards does not include any specialized card that is designed to perform a type of data packet processing that would be performed by one or more chains for the particular virtual interface, then determining that a new decapsulation chain should be created, on the network element, for the particular virtual interface.

10. A method as recited in claim 1, wherein determining whether a new encapsulation chain should be created and determining whether a new decapsulation chain should be created are based on user input.

11. A method of selectively creating chains on a plurality of cards of a network router, the method comprising the computer-implemented steps of:
for each particular card within the plurality of cards, performing the steps of:
for each particular virtual interface of the particular card, performing the steps of:
determining whether at least one physical port of the particular card is configured to send data packets of a type that would be produced by an encapsulation chain for the particular virtual interface;
determining whether at least one physical port of the particular card is (a) configured to receive data packets of a type that would be processed by a decapsulation chain for the particular virtual interface and (b) can send data packets toward a destination associated with the particular virtual interface;
determining whether the plurality of cards includes a specialized card that is designed to perform a type of data packet processing that would be performed by one or more chains for the particular virtual interface;
in response to determining that the plurality of cards includes a specialized card that is designed to perform a type of data packet processing that would be performed by one or more chains for the particular virtual interface, then using no resources of the particular card to create an encapsulation chain and a decapsulation chain for the particular virtual interface;

in response to determining that no physical port of the particular card is configured to send data packets of a type that would be produced by an encapsulation chain for the particular virtual interface, then using no resources of the particular card to create an encapsulation chain for the particular virtual interface;

in response to determining that no physical port of the particular card is configured to receive data packets of a type that would be processed by a decapsulation chain for the particular virtual interface, then using no resources of the particular card to create a decapsulation chain for the particular virtual interface;

in response to determining that at least one physical port of the particular card (a) is configured to send data packets of a type that would be produced by an encapsulation chain for the particular virtual interface and (b) can send data packets toward the destination associated with the particular virtual interface, and the plurality of cards does not include any specialized card that is designed to perform a type of data packet processing that would be performed by one or more chains for the particular virtual interface, then using resources of the particular card to create an encapsulation chain for the particular virtual interface; and in response to determining that at least one physical port of the particular card is configured to receive data packets of a type that would be processed by a decapsulation chain for the particular virtual interface, and the plurality of cards does not include any specialized card that is designed to perform a type of data packet processing that would be performed by one or more chains for the particular virtual interface, then using resources of the particular card to create a decapsulation chain for the particular virtual interface.

12. A volatile or non-volatile computer-readable medium carrying one or more sequences of instructions for selectively creating chains for a virtual interface, which instructions, when executed by one or more processors, cause the one or more processors to carry out:

determining whether a new encapsulation chain should be created, on a network element, for a particular virtual interface by determining whether at least one physical port of a particular card of the network element (a) is configured to send data packets of a type that would be produced by an encapsulation chain for the particular virtual interface and (b) can send data packets toward a destination associated with the particular virtual interface;

determining whether a new decapsulation chain should be created, on the network element, for the particular virtual interface by determining whether at least one physical port of a particular card of the network element is configured to receive data packets of a type that would be processed by a decapsulation chain for the particular virtual interface;

in response to determining that a new encapsulation chain should be created, on the network element, for the particular virtual interface, creating, on the network element, a new encapsulation chain for the particular virtual interface; and in response to determining that a new decapsulation chain should be created, on the network element, for the particular virtual interface, creating, on the network element, a new decapsulation chain for the particular virtual interface.

13. A volatile or non-volatile computer-readable medium as recited in claim 12, wherein the one or more sequences of instructions further comprise instructions which, when executed, cause the one or more processor to carry out avoiding creating, on the network element, a new encapsulation chain for the particular virtual interface, in response to determining that a new encapsulation chain should not be created, on the network element, for the particular virtual interface.

14. A volatile or non-volatile computer-readable medium as recited in claim 12, wherein the one or more sequences of instructions further comprise instructions which, when executed, cause the one or more processor to carry out avoiding creating, on the network element, a new decapsulation chain for the particular virtual interface, in response to determining that a new decapsulation chain should not be created, on the network element, for the particular virtual interface.

15. A volatile or non-volatile computer-readable medium as recited in claim 12, wherein the one or more sequences of instructions further comprise instructions which, when executed, cause the one or more processor to carry out:

avoiding creating, on the network element, a new encapsulation chain for the particular virtual interface, in response to determining that a new encapsulation chain should not be created, on the network element, for the particular virtual interface; and avoiding creating, on the network element, a new decapsulation chain for the particular virtual interface, in response to determining that a new decapsulation chain should not be created, on the network element, for the particular virtual interface.

16. A volatile or non-volatile computer-readable medium as recited in claim 12, wherein the one or more sequences of instructions further comprise instructions which, when executed, cause the one or more processor to carry out:

in response to determining that no physical port of the particular card (a) is configured to send data packets of a type that would be produced by an encapsulation chain for the particular virtual interface and (b) can send data packets toward the destination associated with the particular virtual interface, then determining that a new encapsulation chain should not be created, on the network element, for the particular virtual interface.

17. A volatile or non-volatile computer-readable medium as recited in claim 12, wherein the one or more sequences of instructions further comprise instructions which, when executed, cause the one or more processor to carry out:

in response to determining that no physical port of the particular card is configured to receive data packets of a type that would be processed by a decapsulation chain for the particular virtual interface, then determining that a new decapsulation chain should not be created, on the network element, for the particular virtual interface.

18. A volatile or non-volatile computer-readable medium as recited in claim 12, wherein the one or more sequences of instructions further comprise instructions which, when executed, cause the one or more processor to carry out:

determining whether a plurality of cards of the network element includes a specialized card that is designed to perform a type of data packet processing that would be performed by one or more chains for the particular virtual interface; and in response to determining that the plurality of cards includes a specialized card that is designed to perform a type of data packet processing that would be performed by one or more chains for the particular virtual interface, then determining that a new encapsulation chain should not be created, on the network element, for the particular virtual interface and determining that a new decapsulation chain should not be created, on the network element, for the particular virtual interface.

19. A volatile or non-volatile computer-readable medium as recited in claim 12, wherein the one or more sequences of instructions further comprise instructions which, when executed, cause the one or more processor to carry out:

determining whether a plurality of cards of the network element includes a specialized card that is designed to perform a type of data packet processing that would be performed by one or more chains for the particular virtual interface; and in response to determining that at least one physical port of the particular card (a) is configured to send data packets of a type that would be produced by an encapsulation chain for the particular virtual interface and (b) can send data packets toward the destination associated with the particular virtual interface, and the plurality of cards does not include any specialized card that is designed to perform a type of data packet processing that would be performed by one or more chains for the particular virtual interface, then determining that a new encapsulation chain should be created, on the network element, for the particular virtual interface.

20. A volatile or non-volatile computer-readable medium as recited in claim 12, wherein the step of the one or more sequences of instructions further comprise instructions which, when executed, cause the one or more processor to carry out:

determining whether a plurality of cards of the network element includes a specialized card that is designed to perform a type of data packet processing that would be performed by one or more chains for the particular virtual interface; and in response to determining that at least one physical port of the particular card is configured to receive data packets of a type that would be processed by a decapsulation chain for the particular virtual interface, and the plurality of cards does not include any specialized card that is designed to perform a type of data packet processing that would be performed by one or more chains for the particular virtual interface, then determining that a new decapsulation chain should be created, on the network element, for the particular virtual interface.

21. A volatile or non-volatile computer-readable medium as recited in claim 12, wherein determining whether a new encapsulation chain should be created and determining whether a new decapsulation chain should be created are based on user input.

22. An apparatus for selectively creating chains for a virtual interface, comprising:

a network interface that is coupled to a data network for receiving one or more packet flows therefrom;

a processor;

one or more stored sequences of instructions which, when executed by the processor, cause the processor to carry out:

determining whether a new encapsulation chain should be created, on a network element, for a particular virtual interface by determining whether at least one physical port of a particular card of the network element (a) is configured to send data packets of a type that would be produced by an encapsulation chain for the particular virtual interface and (b) can send data packets toward a destination associated with the particular virtual interface;

determining whether a new decapsulation chain should be created, on the network element, for the particular virtual interface by determining whether at least one physical port of a particular card of the network element is configured to receive data packets of a type that would be processed by a decapsulation chain for the particular virtual interface;

in response to determining that a new encapsulation chain should be created, on the network element, for the particular virtual interface, creating, on the network element, a new encapsulation chain for the particular virtual interface; and in response to determining that a new decapsulation chain should be created, on the network element, for the particular virtual interface, creating, on the network element, a new decapsulation chain for the particular virtual interface.

23. An apparatus as recited in claim 22, wherein the one or more sequences of instructions further comprise instructions which, when executed, cause the one or more processor to carry out avoiding creating, on the network element, a new encapsulation chain for the particular virtual interface, in response to determining that a new encapsulation chain should not be created, on the network element, for the particular virtual interface.

24. An apparatus as recited in claim 22, wherein the one or more sequences of instructions further comprise instructions which, when executed, cause the one or more processor to carry out avoiding creating, on the network element, a new decapsulation chain for the particular virtual interface, in response to determining that a new decapsulation chain should not be created, on the network element, for the particular virtual interface.

25. An apparatus as recited in claim 22, wherein the one or more sequences of instructions further comprise instructions which, when executed, cause the one or more processor to carry out:

avoiding creating, on the network element, a new encapsulation chain for the particular virtual interface, in response to determining that a new encapsulation chain should not be created, on the network element, for the particular virtual interface; and avoiding creating, on the network element, a new decapsulation chain for the particular virtual interface, in response to determining that a new decapsulation chain should not be created, on the network element, for the particular virtual interface.

26. An apparatus as recited in claim 22, wherein the one or more sequences of instructions further comprise instructions which, when executed, cause the one or more processor to carry out:

in response to determining that no physical port of the particular card (a) is configured to send data packets of a type that would be produced by an encapsulation chain for the particular virtual interface and (b) can send data packets toward the destination associated with the particular virtual interface, then determining that a new encapsulation chain should not be created, on the network element, for the particular virtual interface.

27. An apparatus as recited in claim 22, wherein the one or more sequences of instructions further comprise instructions which, when executed, cause the one or more processor to carry out:
    in response to determining that no physical port of the particular card is configured to receive data packets of a type that would be processed by a decapsulation chain for the particular virtual interface, then determining that a new decapsulation chain should not be created, on the network element, for the particular virtual interface.

28. An apparatus as recited in claim 22, wherein the one or more sequences of instructions further comprise instructions which, when executed, cause the one or more processor to carry out:
    determining whether a plurality of cards of the network element includes a specialized card that is designed to perform a type of data packet processing that would be performed by one or more chains for the particular virtual interface; and
    in response to determining that the plurality of cards includes a specialized card that is designed to perform a type of data packet processing that would be performed by one or more chains for the particular virtual interface, then determining that a new encapsulation chain should not be created, on the network element, for the particular virtual interface and determining that a new decapsulation chain should not be created, on the network element, for the particular virtual interface.

29. An apparatus as recited in claim 22, wherein the one or more sequences of instructions further comprise instructions which, when executed, cause the one or more processor to carry out:
    determining whether a plurality of cards of the network element includes a specialized card that is designed to perform a type of data packet processing that would be performed by one or more chains for the particular virtual interface; and
    in response to determining that at least one physical port of the particular card (a) is configured to send data packets of a type that would be produced by an encapsulation chain for the particular virtual interface and (b) can send data packets toward the destination associated with the particular virtual interface, and the plurality of cards does not include any specialized card that is designed to perform a type of data packet processing that would be performed by one or more chains for the particular virtual interface, then determining that a new encapsulation chain should be created, on the network element, for the particular virtual interface.

30. An apparatus as recited in claim 22, wherein the one or more sequences of instructions further comprise instructions which, when executed, cause the one or more processor to carry out:
    determining whether a plurality of cards of the network element includes a specialized card that is designed to perform a type of data packet processing that would be performed by one or more chains for the particular virtual interface; and
    in response to determining that at least one physical port of the particular card is configured to receive data packets of a type that would be processed by a decapsulation chain for the particular virtual interface, and the plurality of cards does not include any specialized card that is designed to perform a type of data packet processing that would be performed by one or more chains for the particular virtual interface, then determining that a new decapsulation chain should be created, on the network element, for the particular virtual interface.

31. An apparatus as recited in claim 22, wherein determining whether a new encapsulation chain should be created and determining whether a new decapsulation chain should be created are based on user input.

* * * * *